US011816376B1

(12) United States Patent
Miyahara et al.

(10) Patent No.: US 11,816,376 B1
(45) Date of Patent: Nov. 14, 2023

(54) INFORMATION PROCESSING APPARATUS, IMAGE FORMING SYSTEM, AND IMAGE FORMING METHOD FOR EXPANDING UNPRESENTED JOBS AND ADJUSTING PRINTING ORDER (71) Applicant: KYOCERA Document Solutions Inc., Osaka (JP)

(72) Inventors: Norifumi Miyahara, Torrance, CA (US); Yoshihiro Osada, Torrance, CA (US); Kunihiko Shimamoto, Torrance, CA (US); Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/109,757

(22) Filed: Feb. 14, 2023

(51) Int. Cl.
  *G06F 3/12* (2006.01)
(52) U.S. Cl.
  CPC .......... *G06F 3/1263* (2013.01); *G06F 3/1203* (2013.01)
(58) Field of Classification Search
  CPC .... G06F 3/1263; G06F 3/1211; G06F 3/1205; G06F 3/1203; G06F 3/1259; G06F 3/1238; G06F 3/1296; G06F 3/126
  See application file for complete search history.

(56) References Cited

U.S. PATENT DOCUMENTS

| | | | | |
|---|---|---|---|---|
| 2009/0046319 A1* | 2/2009 | Fukusada | ............... | G06F 3/1263 358/1.15 |
| 2012/0206763 A1* | 8/2012 | Yoshida | ................ | G06F 3/1263 358/1.15 |
| 2014/0355031 A1* | 12/2014 | Fukuda | .............. | G06K 15/4065 358/1.14 |
| 2015/0220661 A1* | 8/2015 | Nanaumi | ................ | H04L 67/10 707/722 |

FOREIGN PATENT DOCUMENTS

JP      2010-023367 A      2/2010

* cited by examiner

*Primary Examiner* — Iriana Cruz
(74) *Attorney, Agent, or Firm* — Hawaii Patent Services; Nathaniel K. Fedde; Kenton N. Fedde

(57) ABSTRACT

Provided is an information processing apparatus that can appropriately adjust the printing order even if there are unpresented jobs by filtering. An instruction acquiring unit filters the plurality of jobs according to a specific condition, presents a job list in which only filtered job is arranged in printing order, and acquires an instruction to change the printing order for selected job. A list expanding unit expands and presents at least part of unpresented job that is not presented by the filtering by the instruction acquiring unit in the job list when a specific time has elapsed while the selected job exists. A list adjusting unit adjusts the printing order in the job list according to the instruction having the unpresented job expanded by the list expanding unit. An image forming unit respectively outputs the plurality of jobs in the printing order.

15 Claims, 7 Drawing Sheets

INFORMATION PROCESSING APPARATUS, IMAGE FORMING SYSTEM, AND IMAGE FORMING METHOD FOR EXPANDING UNPRESENTED JOBS AND ADJUSTING PRINTING ORDER

BACKGROUND

The present disclosure relates to an information processing apparatus, an image forming system, and an image forming method capable of changing the order of priority in printing a plurality of jobs.

Typically, there is an image forming apparatuses such as a multifunctional peripheral (MFP), or the like, capable of printing documents and images.

As a typical image forming apparatus, there is described an image forming apparatus which places a job in a standby state, accepts an operation input by an operation display unit, and displays a priority order change screen on the operation display unit. This apparatus functions as a priority order change unit to change the priority order of jobs in the standby state on the displayed priority order change screen. Then, the job is prohibited from being newly executed while the priority order change screen is being displayed. Then, after the priority order change screen is displayed, the print unit executes the jobs in the standby state according to the priority order and prints the images.

SUMMARY

An information processing apparatus according to the present disclosure is an information processing apparatus capable of changing the printing order of a plurality of jobs, including: an instruction acquiring unit that filters the plurality of jobs according to a specific condition, presents a job list in which only a filtered job is arranged in printing order, and acquires an instruction to change the printing order for a selected job; a list expanding unit that expands and presents at least part of unpresented job that is not presented by the filtering by the instruction acquiring unit in the job list when a specific time has elapsed while the selected job exists; and a list adjusting unit that adjusts the printing order in the job list according to the instruction having the unpresented job expanded by the list expanding unit.

An image forming system according to the present disclosure is an image forming system capable of changing the printing order of a plurality of jobs, including: an instruction acquiring unit that filters the plurality of jobs according to a specific condition, presents a job list in which only a filtered job is arranged in printing order, and acquires an instruction to change the printing order for a selected job; a list expanding unit that expands and presents at least part of unpresented job that is not presented by the filtering by the instruction acquiring unit in the job list when a specific time has elapsed while the selected job exists; a list adjusting unit that adjusts the printing order in the job list according to the instruction having the unpresented job expanded by the list expanding unit; and an image forming unit that respectively outputs the plurality of jobs in the printing order based on the job list adjusted by the list adjusting unit.

An image forming method of the present disclosure is an image forming method executed by an image forming system capable of changing the printing order of a plurality of jobs, including the steps of: filtering the plurality of jobs according to a specific condition; presenting a job list in which only a filtered job is arranged in printing order; causing a job to be selected in the job list; acquiring an instruction to change the printing order; expanding and presenting at least part of unpresented job that is not presented by the filtering in the job list when a specific time has elapsed while the selected job exists; adjusting the printing order in the job list according to the instruction having the expanded unpresented job; and outputting, respectively, the plurality of jobs in the printing order based on the adjusted job list.

DETAILED DESCRIPTION

Embodiment

[System Configuration of Information Processing System X]

Figure 1:
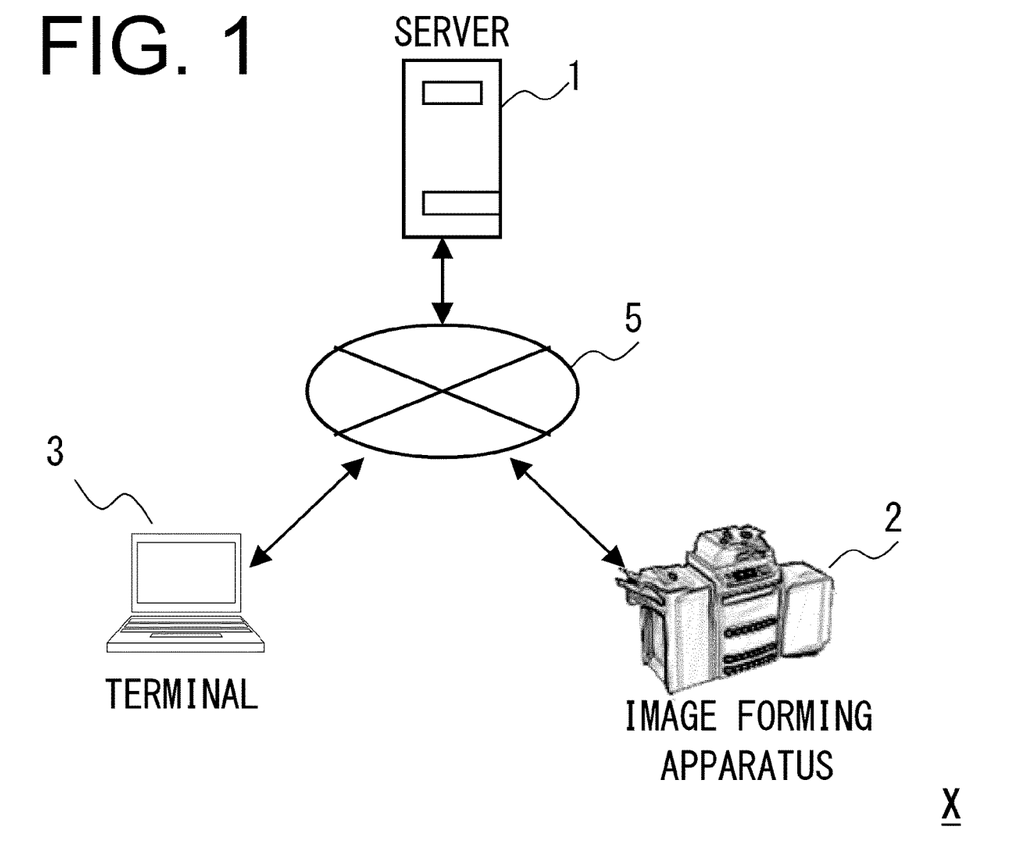
FIG. 1 is a system configuration diagram of an image forming apparatus according to an embodiment of the present disclosure.

Firstly, with reference to FIG. 1, a system configuration of an information processing system X according to the embodiment of the present disclosure is described.

The information processing system X is configured by connecting a server 1, an image forming apparatus 2, and a terminal 3 via a network 5.

The server 1 is an information processing apparatus capable of transmitting and receiving various data to and from the image forming apparatus 2. In the present embodiment, the server 1 is a PC (Personal Computer), a general-purpose machine, a server including a virtual server on the cloud, a NAS (Network Attached Storage), or the like. The server 1 acquires and stores the job 200 (FIG. 4) from the terminal 3, and it outputs to print the stored job 200 to the image forming apparatus 2 according to the printing order. In the present embodiment, the printing order can be changed from the terminal 3 or the image forming apparatus 2 by the user's instruction.

In addition, the server 1 may also support so-called "pull printing" in which the job 200 is selected and printed on the image forming apparatus 2. Also, the server 1 may be capable of performing image processing, OCR (Optical Character Recognition) processing, classification processing, DMS (Document Management System) processing, and the like.

The image forming apparatus 2 is a document reading apparatus such as an MFP (Multi-Functional Peripheral), a network scanner, a document scanner, a network FAX, or a printer with a scanner function. The image forming apparatus 2 may execute application software (hereinafter simply referred to as "application") for connecting to the server 1.

Figure 4:
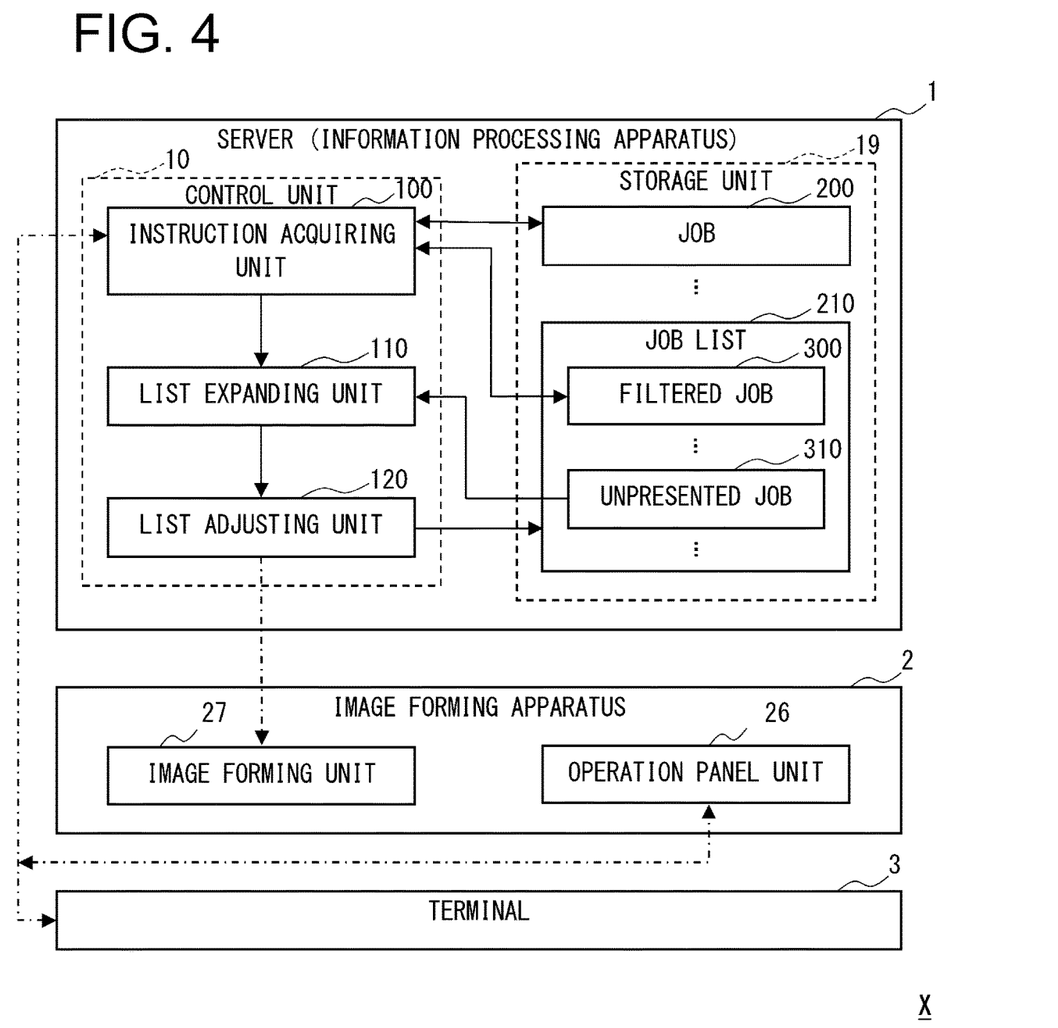
FIG. 4 is a block diagram showing the functional configuration of the image forming apparatus according to the embodiment of the present disclosure.

The terminal 3 is a PC, a smart phone, a tablet terminal, a dedicated terminal, or the like, which the user creates and transmits the job 200 (FIG. 4). The terminal 3 has an input unit and a display unit, and various instructions can be given by a GUI (Graphical User Interface). In the present embodiment, the instruction includes an instruction to change the printing order of the jobs 200 stored in the server 1.

The network 5 is a LAN (Local Area Network), a wireless LAN (Wi-Fi), a mobile phone network, another WAN (Wide Area Network), a voice telephone network, or the like. The network 5 may be an intranet, a "cloud" network, or the like, and a VPN (Virtual Private Network) may be set up.

In addition, a plurality of each of the server 1, the image forming apparatus 2, and the terminal 3 may be included.

(Control Configuration of Server 1)

Figure 2:
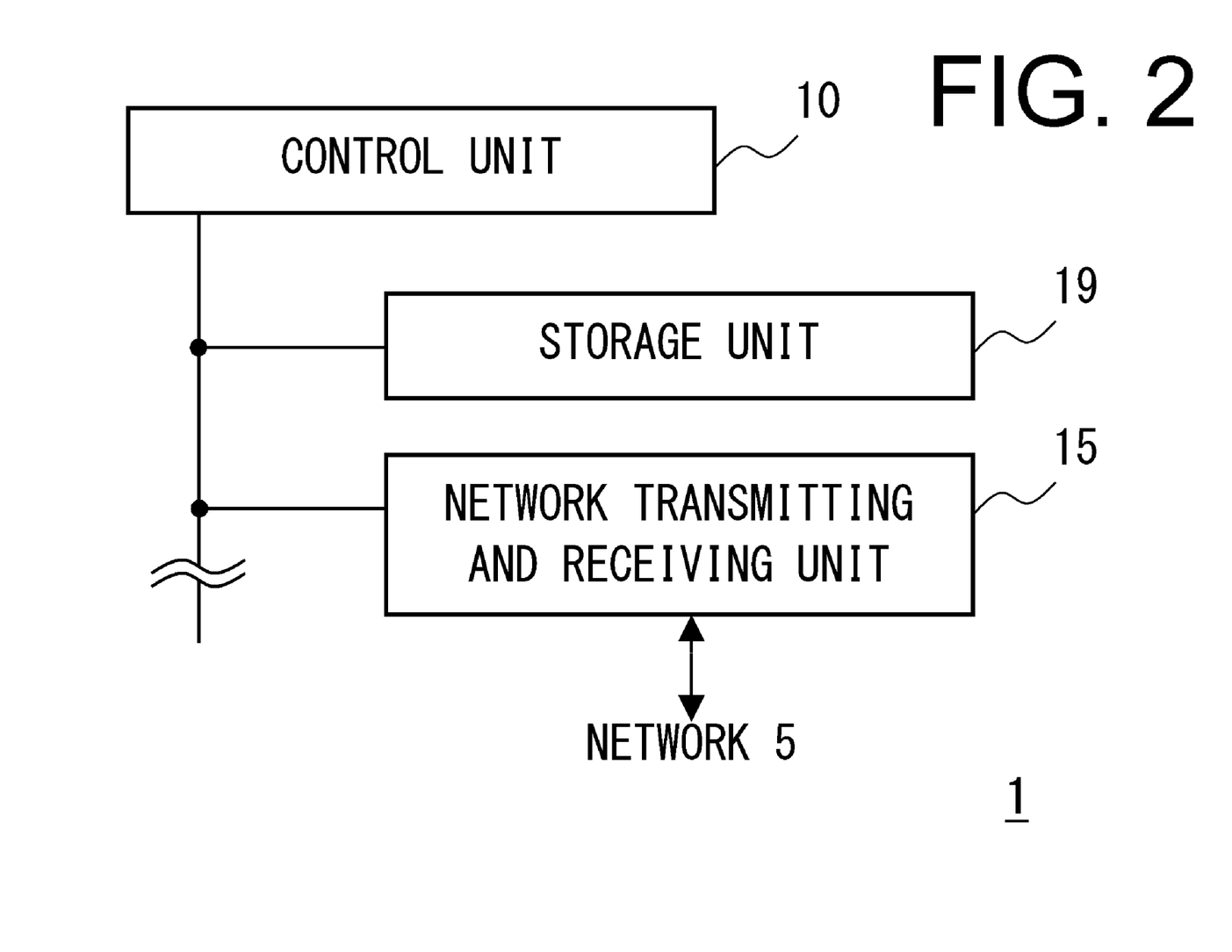
FIG. 2 is a block diagram showing the control configuration of the server as shown in FIG. 1.

Next, with reference to FIG. 2, a control configuration of the server 1 is described.

The server 1 includes a control unit 10, a network transmitting and receiving unit 15, and a storage unit 19.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Processor, a special purpose processor), or the like.

The control unit 10 reads the control program stored in the ROM, SSD, or HDD of the storage unit 19, develops the control program in the RAM, and executes it, thereby operating as each unit of the function blocks as described later.

In the present embodiment, the control program includes an OS (Operating System), a WWW (World Wide Web) server (Daemon), various services, application software (hereinafter simply referred to as "application"), and the like. These various services and applications allow the image forming apparatus 2 and the terminal 3 to display (present) the job list 210 (FIG. 4) and acquire various instructions from the user.

The network transmitting and receiving unit 15 is a network connection unit including a LAN board, a wireless transmitter and receiver, and the like, for connecting to the network 5.

In the present embodiment, the network transmitting and receiving unit 15 is connected via the network 5 to the image forming apparatus 2 and the terminal 3 where the user creates and transmits the job 200 (FIG. 4).

In addition, the network transmitting and receiving unit 15 transmits and receives data through the data communication line, and it transmits and receives voice signals through the voice telephone line.

The storage unit 19 is a non-transitory recording medium. The storage unit 19 may include a RAM (Random Access Memory), or the like, as a main storage unit. Also, the storage unit 19 may include flash memory such as ROM (Read Only Memory), eMMC (embedded Multi Media Card), SSD (Solid State Drive), HDD (Hard Disk Drive), or the like, as an auxiliary storage unit. In this such, the control program for controlling the operation of the image forming apparatus 2 is stored in the auxiliary storage unit of the storage unit 19.

The storage unit 19 may also include an area for storing the job 200 (FIG. 4), an area for a document box (storage folder, shared folder) for each user, and the like. In addition, the storage unit 19 may store information regarding the performance and functions of the server 1.

In addition, the storage unit 19 may include external storage media such as various flash memories and optical recording media.

(Control Configuration of Image Forming Apparatus 2)

Figure 3:
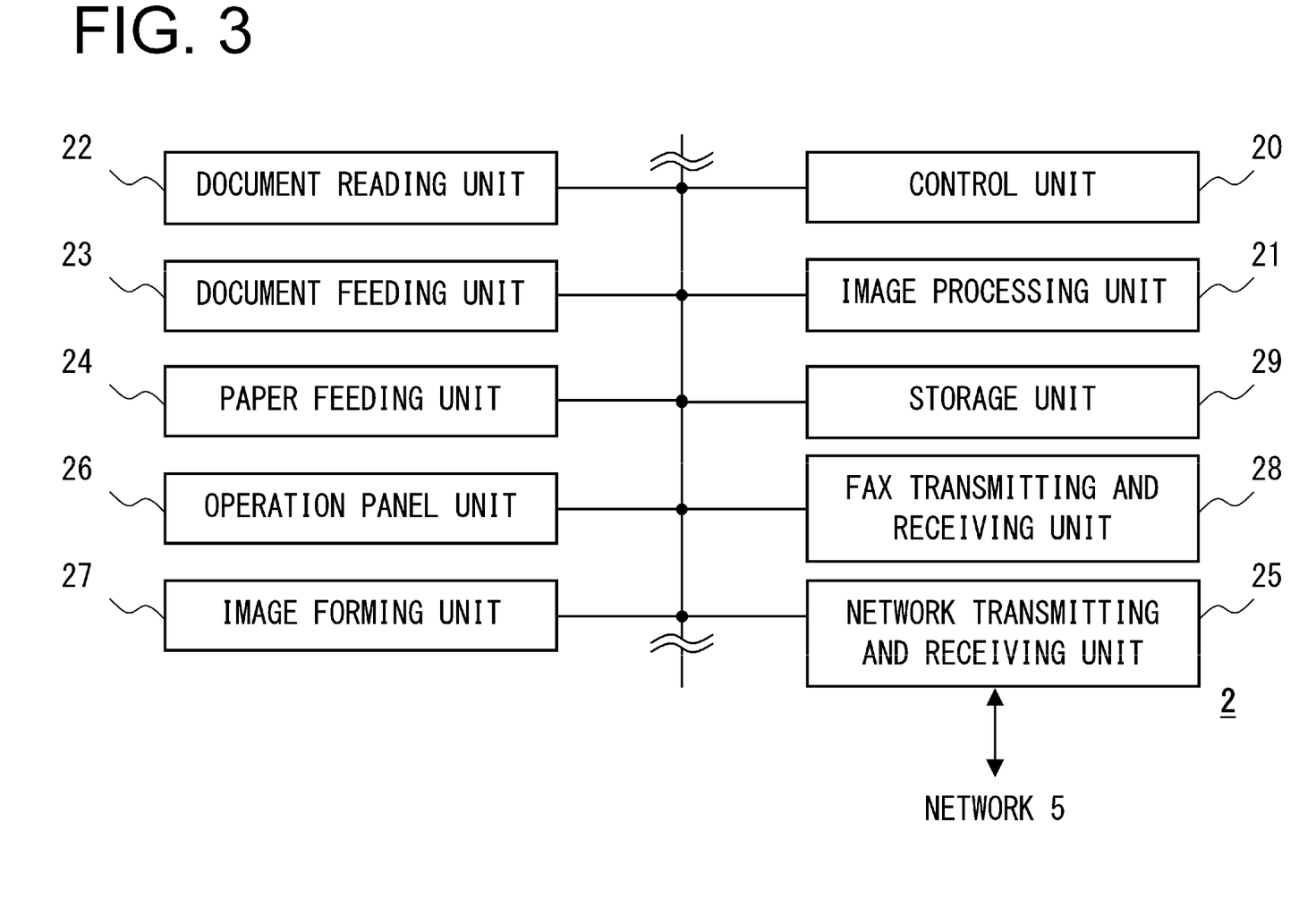
FIG. 3 is a block diagram showing a control configuration of the image forming apparatus shown in FIG. 1.

Next, with reference to FIG. 3, a control configuration of the image forming apparatus 2 is described.

The image forming apparatus 2 includes an image processing unit 21, a document reading unit 22, a document feeding unit 23, a paper feeding unit 24, a network transmitting and receiving unit 25, an operation panel unit 26, an image forming unit 27, a FAX transmitting and receiving unit 28, a storage unit 29, and the like. Each unit is connected to the control unit 20 and controlled in operation by the control unit 20.

The control unit 20 is information processing unit such as a GPP, a CPU, a MPU, a DSP, a GPU, an ASIC, or the like.

The control unit 20 reads out the control program stored in the auxiliary storage unit of the storage unit 29, develops this control program in the main storage unit, and executes it, thereby operating as each units of the function blocks as described later. Further, the control unit 20 controls the entire apparatus according to instruction information input from the terminal 3 or the operation panel unit 26.

The image processing unit 21 is an arithmetic control unit such as a DSP (Digital Signal Processor), a GPU (Graphics Processing Unit), or the like. The image processing unit 21 performs image processing on image data. For example, this image processing may be processing such as blank page detection, enlargement/reduction rotation, density adjustment, gradation adjustment, noise removal, sharpness, other image quality improvement, or the like.

The image processing unit 21 stores the image read by the document reading unit 22 in the storage unit 29 as print data. At this time, the image processing unit 21 can convert the print data into a file in a format such as PDF, TIFF, or the like, and it transmit the file to the server 1 as a job 200 (FIG. 4).

Also, the image processing unit 21 may have an OCR function, an OCR speed-up function, and the like.

The document reading unit 22 reads (scans) a set document. In the present embodiment, the document reading unit 22 is arranged on the upper portion of the main body unit of the image forming apparatus 2.

The document reading unit 22 includes a scanner, a platen glass, and a document reading slit. When reading a document placed on the platen glass, the document reading unit 22 moves the scanner to a position facing the platen glass, reads the document placed on the platen glass while scanning, and obtains image data. The document reading unit 22 stores the acquired image data in the storage unit 29.

Further, when reading a document fed from the document feeding unit 23, the document reading unit 22 moves the scanner to a position facing the document reading slit. Then, the document reading unit 22 reads the document through the document reading slit in synchronization with the document feeding operation of the document feeding unit 23 to obtain image data. The document reading unit 22 stores the acquired image data in the storage unit 29.

The document feeding unit 23 conveys the document read by the document reading unit 22. The document feeding unit 23 is arranged above the document reading unit 22.

The document feeding unit 23 includes a document placing unit and a document conveying mechanism. The document feeding unit 23 feeds the documents placed on the document placing unit one by one by the document conveying mechanism and feeds them to the document reading unit 22.

The paper feeding unit 24 feeds recording paper one by one toward the image forming unit 27. The paper feeding unit 24 is provided inside the main body.

The network transmitting and receiving unit 25 is a network connection unit including a LAN board, a wireless transmitting and receiving apparatus, and the like for connecting to the network 5.

The network transmitting and receiving unit 25 transmits and receives data through a data communication line, and it transmits and receives voice signals through a voice telephone line.

The operation panel unit 26 includes an input unit and a display unit, and it acquires user's instruction. The operation panel unit 26 is arranged on the front side of the image forming apparatus 2.

The input unit of the operation panel unit 26 includes buttons, a touch panel, and the like. Among them, the buttons include a numeric pad, direction buttons, a start button, a cancel button, an operation mode switching button, a button for instructing the job 200 (FIG. 4), and the like. Among these, the operation mode to be switched may be such as copying, FAX transmission, scanner, network scanner, and the like. The input unit of the operation panel unit 26 acquires an instruction for the job 200 (FIG. 4) of the image forming apparatus 2 by the user. The instruction of this job 200 may be to print, send, save, record, change the priority of output, or the like, for the selected document.

The display unit of the operation panel unit 26 is an LCD (Liquid Crystal Display), an organic EL or an organic LED (Organic Light Emitting Diode) display, or the like, and displays the job list 210 (FIG. 4), which is described later.

In the present embodiment, it is possible to select the job 200 (FIG. 4) on the GUI by using the direction buttons or to select the area of the job 200 on the list by pressing and holding it on the touch panel in the operation panel unit 26. On this screen, it is possible to instruct the movement of the selected job 200 by drag and drop, or the like. In addition, it is also possible to input and change the information of each user according to the user's instructions obtained from the operation panel unit 26.

Further, it is possible to display a screen, which is similar to the GUI in the operation panel unit 26, on the terminal 3 as well, from the installed apparatus driver, application, or the like of the image forming apparatus 2. This allows the user to give instructions from the terminal 3 as well.

The image forming unit 27 causes image formation on recording paper from the job 200 (FIG. 4) according to the user's output instruction.

The image forming unit 27 includes a photosensitive drum, an exposure unit, a development unit, a transfer unit, a fixing unit, and the like, in the case of the electro-dry photography method. The image forming unit 27 records a toner image on recording paper by performing an image forming process including charging, exposure, development, transfer, and fixing. Alternatively, in the case of an inkjet method, the image forming unit 27 can discharge ink from an ink tank to form an image on recording paper.

Accordingly, the image forming unit 27 can output the job 200 (FIG. 4) by printing, or the like.

In addition, the image forming unit 27 can also output to a file or the like.

The FAX transmitting and receiving unit 28 transmits and receives facsimiles. The FAX transmitting and receiving unit 28 receives facsimile data from the other FAX apparatus via a voice line, stores the received FAX image data in the storage unit 29, or transmits it to the server 1 as the job 200 (FIG. 4).

Further, the FAX transmitting and receiving unit 28 may transmit the document read by the document reading unit 22 or the FAX image data for the network FAX transmitted from the terminal 3 to the server 1 as the job 200.

The FAX image data can be image-formed by the image forming unit 27. Alternatively, the FAX image data can be transmitted to the other FAX apparatus as facsimile via the voice line.

The storage unit 29 is a non-transitory recording medium including a semiconductor memory such as RAM and ROM, magnetic recording medium such as HDD, or the like.

A control program for controlling the operation of the image forming apparatus 2 is stored in the ROM or HDD of the storage unit 29. In addition, the storage unit 29 may also store user account settings.

In addition, the control unit 10 of the server 1, the control unit 20 and the image processing unit 21 of the image forming apparatus 2 are integrally integrated, such as a CPU having built-in GPU, a chip-on-module package, an SOC (System On a Chip), or the like, respectively.

Also, the control units 10, 20, and the image processing unit 21 may incorporate with RAM, ROM, flash memory, or the like.

[Functional Configuration of Image Forming System X]

Here, with reference to FIG. 4, a functional configuration of the image forming system X is described.

The control unit 10 of the server 1 includes an instruction acquiring unit 100, a list expanding unit 110 and a list adjusting unit 120.

The storage unit 19 stores jobs 200 and job lists 210.

The instruction acquiring unit 100 filters the plurality of jobs 200 under specific conditions, and it presents the job list 210 in which only the filtered jobs 300 are arranged in printing order. For this specific condition, for example, the ID or name of the job 200, the job 200 for the logged-in user, the job 200 of the group to which the user belongs, or the like, may be set.

That means, in the present embodiment, as filtering, an example of selecting the filtered job 300 to be displayed from the plurality of jobs 200 is described. Conversely, there may be a job that is not displayed and not presented due to filtering (hereinafter referred to as "unpresented job 310") in the job list 210.

In addition, as the specific condition, it may be possible to perform filtering according to the type of the job 200, the content of the document to be output, or the like.

On this basis, the instruction acquiring unit 100 obtains an instruction to select the filtered job 300 and change the printing order. At this time, in the present embodiment, the job list 210 is presented by the GUI on the terminal 3 or the display unit of the operation panel unit 26. Then, based on the data input by the user from the terminal 3 or the input unit of the operation panel unit 26, a filtered job 300 is selected for changing the printing order and instructions on how to change the printing order are acquired.

As a result, the instruction acquiring unit 100 can present the job list 210 in which the jobs 200 to be presented are arranged in the printing order, and it acquires the instruction to change the printing order.

The list expanding unit 110 expands and presents at least a part of the unpresented job 310 in the job list 210 when a specific time has passed while the filtered job 300 that is selected by the user exists (hereinafter calls "selected filtered job 300"). That means, the specific time is the time until the unpresented job 310 is expanded. This specific time may be set based on the time corresponding to the user's response to instruct to change the printing order for the selected filtered job 300. Specifically, the specific time may be several hundred milliseconds to several seconds, or the like.

In this way, the list expanding unit 110 can temporarily present (display) the unpresented job 310 when the movement instruction is acquired.

In addition, when an instruction to move the selected filtered job 300 out of the job list 210 is acquired while the unpresented job 310 is expanded, the list expanding unit 110 returns the unpresented job 310 to the unpresented state again. Here, when the unpresented job 310 is expanded, the list expanding unit 110 can present a hint for an instruction to move the selected filtered job 300 out of the job list 210.

The list adjusting unit 120 adjusts the printing order in the job list 210 according to the change instruction for the printing order including the unpresented job 310 expanded by the list expanding unit 110. At this time, the list adjusting unit 120 may adjust the priority of the printing order of the filter job 300 in the job list 210 and reflect it in the job list 210.

In the present embodiment, the image forming unit 27 outputs the plurality of jobs 200 in the printing order based on the job list 210 adjusted by the list adjusting unit 120, respectively. At this time, the image forming unit 27 may print out the jobs 200 acquired from the server 1 one by one. Otherwise, the job 200 may be output as a file, transmit and output to the other apparatus, or the like.

The job 200 is document data stored in a document box (storage folder) in the storage unit 19. Specifically, the job 200 may be document data acquired from the terminal 3, or read by the document reading unit 22, or facsimile-received by the FAX transmitting and receiving unit 28 in the image forming apparatus 2. The document data may be page language data, image data such as TIFF, data of various application software (hereinafter referred to as "application"), or the like.

In the present embodiment, in the job 200, for example, information such as the job name, which is the ID and name of the job 200, the status (state) information, which indicates whether it is on standby or being output (executing), or the like, may be set as metadata, or the like. Among these, the state information may include information on the priority of printing order, information on the state indicating interrupt printing, and the like. This priority of printing order may be designated by the user by the terminal 3 or the operation panel unit 26 at the time of generating or after generating the job 200. Furthermore, apart from the set priority of printing order, an internal priority that is changed or adjusted according to the user's instruction to move the filtered job 300 in the job list 210 may be set in the job 200.

The job list 210 is list-format data in which the plurality of jobs 200 are arranged in printing order.

In the present embodiment, the job list 210 may be presented to the user in a table-like format. At the time of this presentation, the job list 210 is arranged, for example, so that the direction of early printing is upward and the direction of late printing is downward for each job 200. At this time, the job list 210 may display the printing order, status, job 200 names, priority, or the like on the display unit of the operation panel unit 26 of the terminal 3 or the image forming apparatus 2. Note that the job list 210 may internally be data in FIFO (First In, First Out) format instead of a normal table format.

In the present embodiment, job list 210 includes the filtered job 300 and the unpresented job 310.

The filtered job 300 is a job 200 filtered by the specific condition. In the present embodiment, the filtered job 300 is presented by being displayed in the job list 210 on the terminal 3 or the operation panel unit 26 in the image forming apparatus 2.

The unpresented job 310 is a job 200 that is not presented by filtering of the instruction acquiring unit 100. The unpresented job 310 may not be presented by not being displayed on the job list 210 until one or more of the filtered jobs 300 are selected by the user.

Here, the control unit 10 of the server 1 is caused to function as the instruction acquiring unit 100, the list expanding unit 110, and the list adjusting unit 120 by executing a control program stored in the storage unit 19. Thereby, the server 1 according to the present embodiment can change the priority in printing order of the plurality of jobs 200.

Also, each part of the server 1, the image forming apparatus 2, and the terminal 3 as described above are hardware resources that execute the image forming method according to the present disclosure.

In addition, a part or any combination of the functional configurations as described above may be configured in terms of hardware or circuits by using an IC, programmable logic, FPGA (Field-Programmable Gate Array), or the like.

[Priority Change and Output Process by Image Forming System X]

Figure 5:
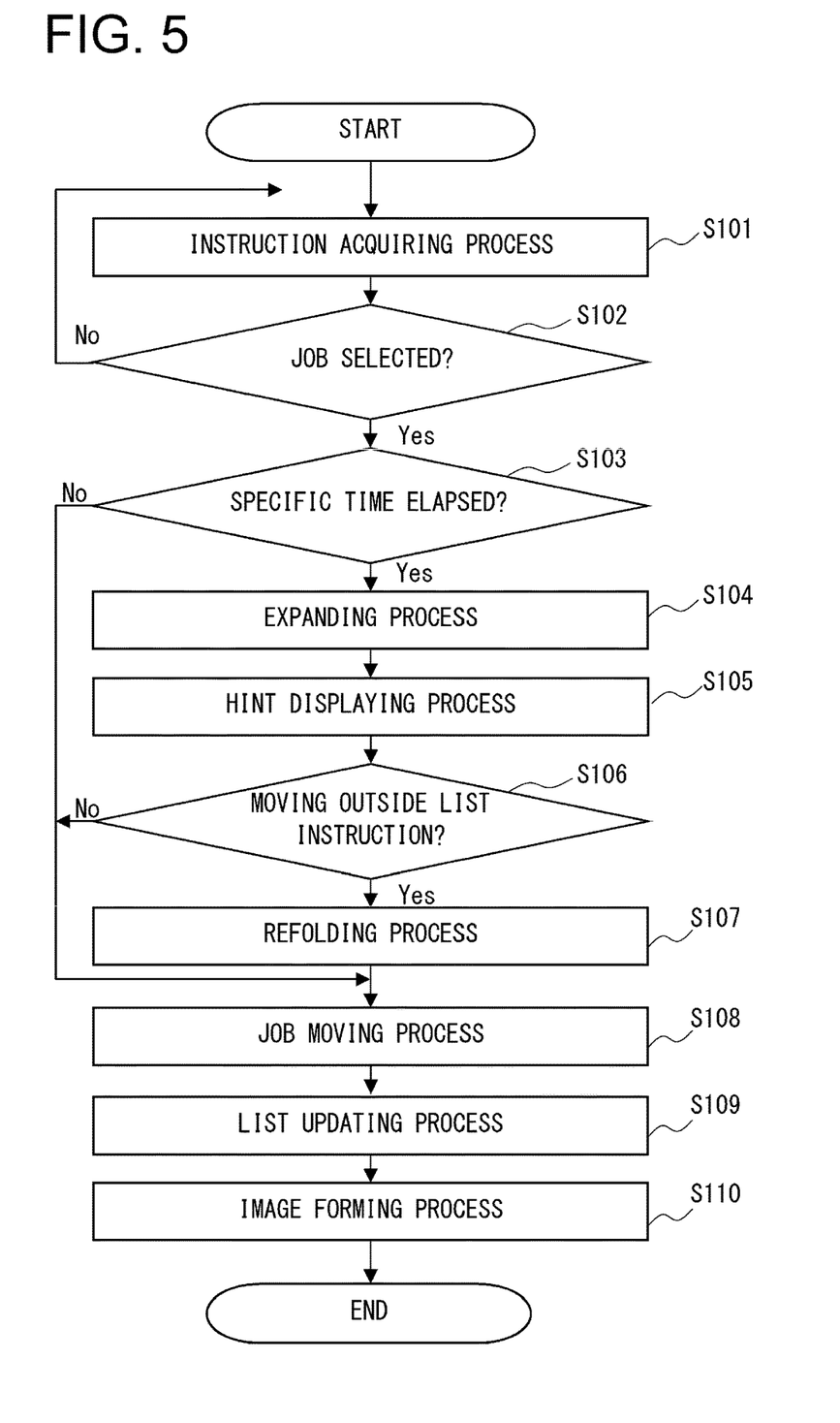
FIG. 5 is a flowchart of priority change and output process according to the embodiment of the present disclosure.
Figure 6:
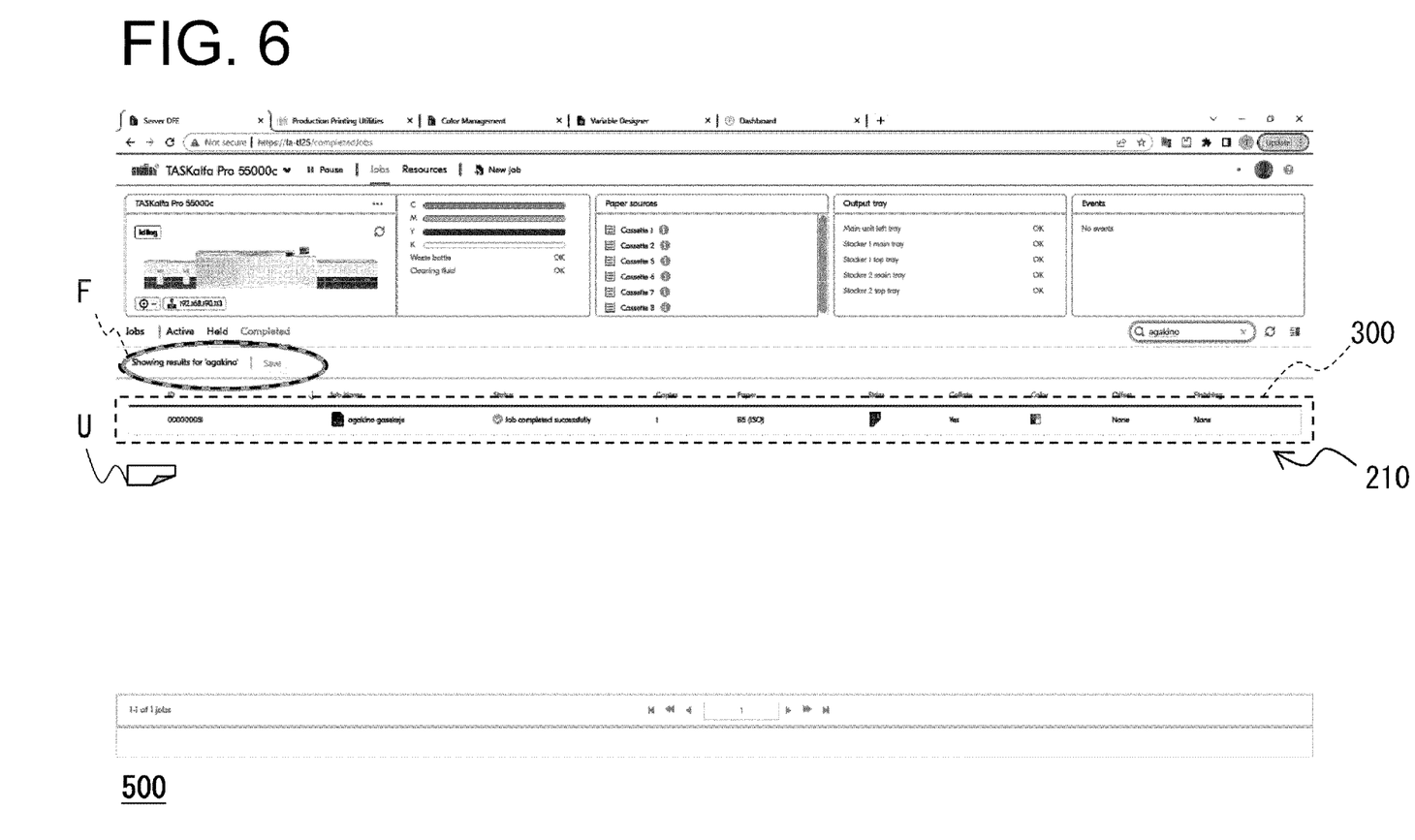
FIG. 6 is a screen example of the priority change and output process as shown in FIG. 5.
Figure 7:
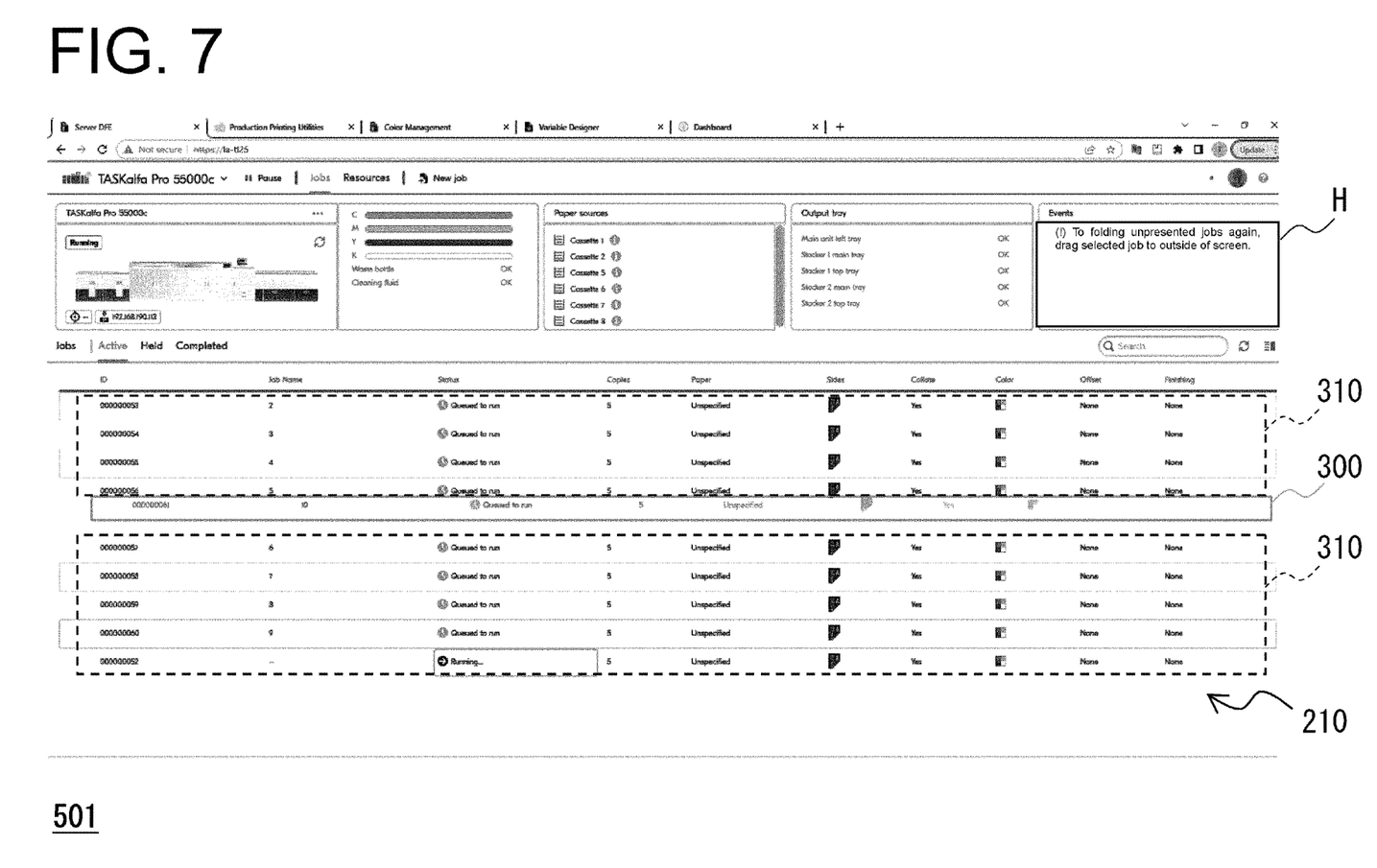
FIG. 7 is a screen example of the priority change and output process as shown in FIG. 5.

Next, with reference to FIGS. 5 to 7, a priority change and output process by the image forming system X according to the embodiment of the present disclosure is described.

In the priority change and output process according to the present embodiment, mainly the control unit 10 of the server 1 executes a program stored in the storage unit 19 in cooperation with each unit and using hardware resources.

With reference to the flowchart of FIG. 5, the details of the priority change and output process are described step by step as follows.

(Step S101)

Firstly, the instruction acquiring unit 100 performs an instruction acquisition process.

The instruction acquiring unit 100 waits until an instruction is acquired. At this time, the instruction acquiring unit 100 monitors the storage unit 19 and grasps the addition of the job 200. In addition, the instruction acquiring unit 100 also acquires the status of the job 200 executed in the other thread, or the like. Specifically, the instruction acquiring unit 100 acquires the status of each job 200, such as waiting, outputting (printing), outputting completed, or the like, from the image forming apparatus 2.

Based on this, the instruction acquiring unit 100 generates the job list 210 in which the plurality of jobs 200 are arranged in printing order according to the priority of each job 200, and it updates the job list 210 in real time.

Then, the user logs-in the server 1 from the web browser or application of the terminal 3 or the operation panel unit 26 of the image forming apparatus 2 and issues an instruction to display the job list 210.

When acquiring this instruction, the instruction acquiring unit 100 presents the job list 210 to the user by displaying it on the terminal 3 or the display unit of the operation panel unit 26.

In the present embodiment, the instruction acquiring unit 100 can filter the job list 210 according to the specific condition and display the job list 210 in which only the filtered jobs 300 are arranged in printing order.

With reference to FIG. 4, details of this filtering and selecting job 200 are described.

In the screen example 500 of FIG. 4, "agakino" is inputted in the field F for inputting a keyword for filtering the job list 210, and the filtered job 300 having the job name of "agakino" is displayed in the job list 210. That is, when filtering is performed by "agakino", the job 200 other than "agakino" becomes the unpresented job 310 and is not displayed.

Further, as like the icon U, the instruction acquiring unit 100 can indicate that the unpresented job 310 exists.

Here, in the filtered job list 210, the user selects the filtered job 300 in the job list 210 by using the buttons of the input unit, the touch panel, or the like. In the present embodiment, it is possible to select one or more filtered job 300 by using a mouse or the like on the GUI of the terminal 3, or by using the numeric keypad, direction buttons, or touch panel operation of the operation panel unit 26.

The instruction acquiring unit 100 acquires the selection of this filtered job 300.

Further, the user instructs to change the print order by moving the filtered job 300. In the present embodiment, the movement instruction to move the selected filtered job 300 is given by numeric pad, direction buttons, dragging, or the like.

The instruction acquiring unit 100 acquires this movement instruction. This makes it possible to directly change the order in which the selected filtered job 300 is printed.

In this screen example 500, when changing the printing order of the filtered job 300 of "agakino", the user selects only one filtered job 300 displayed in this example. Then, the user moves the selected filtered job 300 to an arbitrary position on the job list 210 by drag & drop, touch panel, or button operation. As a result, it is possible to intuitively give an instruction to change the printing order of the job 200.

(Step S102)

Next, the instruction acquiring unit 100 determines whether or not the job 200 has been selected. The instruction acquiring unit 100 determines Yes if the selected job 200 exists. In other cases, the instruction acquiring unit 100 determines No.

In the case of Yes, the instruction acquiring unit 100 advances the process to step S103.

In the case of No, the instruction acquiring unit 100 returns the process to step S101 and continues acquiring the instruction.

(Step S103)

If the job 200 is selected, list expanding unit 110 determines whether the specific time has been elapsed or not.

If the specific time has elapsed during the selected job 200 exists, the list expanding unit 110 determines Yes. Specifically, if the specific time has elapsed while dragging and not dropping, or without releasing the touch panel, the list expanding unit 110 determines Yes. Otherwise, the list expanding unit 110 determines No.

In the case of Yes, list expanding unit 110 advances the process to step S104.

In the case of No, list expanding unit 110 advances the process to step S108.

(Step S104)

If the specific time has elapsed, the list expanding unit 110 performs expanding process.

In the present embodiment, the list expanding unit 110 expands at least part of the unpresented job 310 within the job list 210 and presents it.

In the present embodiment, if even one hidden unpresented job 310 exists, all the unpresented jobs 310 are automatically displayed on the job list 210. As a result, as many unpresented jobs 310 as can be displayed on the display unit are displayed, centering on the selected filtered job 300.

In the example screen 501 of FIG. 7, all unpresented jobs 310 are expanded and displayed while the selected filtered job 300 is being dragged upward. During this expanding, the position of the selected filtered job 300 on the job list 210 and the position of the unpresented job 310 may be visually indicated by animation, or the like.

This allows the user to move the selected filtered job 300 to any printing order position, including the unpresented job 310.

(Step S105)

Next, the list expanding unit 110 performs hint displaying process.

When the unpresented job 310 is expanded, the list expanding unit 110 presents the hint of the instruction to prevent the unpresented job 310 from being displayed. Specifically, by instructing to move the selected filtered job 300 out of the job list 210, it is possible to make the unpresented job 310 unpresented state again.

In column H in FIG. 7, the hint messages such as "(!) To fold the unpresented job again, drag the selected job out of the screen." is described.

(Step S106)

Then, the list expanding unit 110 determines whether the instruction to move out of the list is acquired or not. If the list expanding unit 110 acquires the instruction to move the selected filtered job 300 out of the job list 210, it determines Yes. In the present embodiment, the list expanding unit 110 determines Yes if receiving an instruction to move the selected filtered job 300 out of the job list 210 while dragging it or keeping the finger on the touch panel. Otherwise, the list expanding unit 110 determines No.

In the case of Yes, the list expanding unit 110 advances the process to step S107.

In the case of No, list expanding unit 110 advances the process to step S108.

(Step S107)

If receiving an instruction to move the selected filtered job 300 out of the job list 210, the list expanding unit 110 performs refolding process.

In the present embodiment, the list expanding unit 110 restores the unpresented job 310 to an unpresented state. In other words, the list expanding unit 110 refolds the unpresented job 310 on the job list 210 and does not present it again by not-displaying. As a result, the state of the list of unpresented jobs 310 can be changed to either the displaying state or the non-displaying state according to the user's intention, easily.

(Step S108)

Here, the list expanding unit 110 performs job moving process.

The list expanding unit 110 moves the selected filtered job 300 to the position on the job list 210 according to the user's move instruction even if there is an unpresented job 310 between them.

In addition, if the job is dropped or the touch panel is released within the specific time, the printing order is changed within the printing order of the displayed filtered job 300.

(Step S109)

Then, the list adjusting unit 120 performs list updating process.

The list adjusting unit 120 adjusts the priority order of the jobs 200 corresponding with moving of the filtered job 300 and reflects it on the job list 210 stored in the storage unit 19. At this time, the list adjusting unit 120 adjusts the printing order in the job list 210 according to the change instruction including the unpresented job 310. Here, in the case of the job 200 for which the priority or the internal priority is set, the list adjusting unit 120 may adjust the order of printing according to the printing order of its priority or internal priority as the final printing order.

In addition, in each of the above examples, the job list 210 after reflection can be displayed on the terminal 3 or the display unit of the operation panel unit 26. Here, after the moving is completed, only the filtering job 300 may be displayed on the display unit as in the case of the refolding process as described above.

(Step S110)

Then, the list adjusting unit 120 and the image forming unit 27 of the image forming apparatus 2 perform image forming process.

The list adjusting unit 120 transmits the plurality of jobs 200 stored in the storage unit 19 to the image forming apparatus 2 according to their priorities. Specifically, the list adjusting unit 120 sequentially transmits the job 200 at the top of the job list 210 and deletes it from the job list 210.

The image forming apparatus 2 that receives this job 200 stores it in the storage unit 29. In this process, the job 200 is, for example, raster image processor (RIP) processed, color converted, and converted to binary values by the control unit 20 and image processing unit 21. This generates band data for printing. The band data is formed into an image by image forming unit 27. As a result, the image data of the job 200 can be printed page by page. Otherwise, as the output, the job 200 can be converted to PDF, or the like, or transmitted to the other apparatus.

With the above, the priority change and output process according to the embodiment of the present disclosure ends.

As configured in this way, the following effects can be obtained.

In a typical image forming apparatus, when changing the order of jobs, even if there are jobs that have been filtered and are not presented, the printing order is changed without changing the job list. In this case, a step was necessary to allow the user to select whether or not to display the jobs that are not presented in the job list. Furthermore, when the printing order of the job is changed, the user is required to confirm the changed position.

As described above, it is not user-friendly and the printing order cannot be adjusted, appropriately.

On the other hand, the image forming system X according to the present embodiment is an image forming system that can change the printing order of a plurality of jobs 200, including: an instruction acquiring unit 100 that filters the plurality of jobs 200 according to a specific condition, presents a job list 210 in which only a filtered job 300 is arranged in printing order, and acquires an instruction to change the printing order for a selected filtered job 300; a list expanding unit 110 that expands and presents at least part of unpresented job 310 that is not presented by the filtering by the instruction acquiring unit 100 in the job list 210 when a specific time has elapsed while the selected filtered job 300 exists; a list adjusting unit 120 that adjusts the printing order in the job list 210 according to the instruction having the unpresented job 310 expanded by the list expanding unit 110; and an image forming unit 27 that outputs the plurality of jobs 200 in the printing order based on the job list 210 adjusted by the list adjusting unit 120.

As configured in this way, when changing the printing order of the jobs 200 in the filtered job list 210, the unpresented jobs 310 are not displayed, or on the job list 210, which also includes the unpresented job 310, and let the user choose at which position to move the selected filter job 300. Thus, in the job list 210 in which the unpresented job 310 exists after being filtered, at least a part of the unpresented job 310 is expanded within the job list 210 and presented. As a result, the printing order of the job 200 can be changed more intuitively only by user operation, and the printing order can be appropriately adjusted.

Therefore, when there are more jobs 200 not yet presented than the user anticipated, the user can avoid the inconvenience because his or her turn does not come around easily, and thereby improving usability.

In the server 1 according to the present embodiment, the list expanding unit 110 returns the unpresented job 310 to the unpresented state again when acquiring an instruction to move the selected filter job 300 out of the job list 210 while the unpresented job 310 is expanded.

By configuring in this way, it is possible to easily transition to either list state. In other words, in the job list 210 with the unpresented jobs 310 by the filtering, the user action can be used to seamlessly switch between changing the printing order of only the displayed filtered jobs 300 and changing the printing order including the unpresented jobs 310.

As a result, there is no need for a separate instruction to re-present the unpresented job 310 by using a button, or the like, and the printing order of the jobs 200 can be intuitively changed by the user's operation.

In the server 1 according to the present embodiment, the list expanding unit 110 presents a hint about the instruction to move the filtered job 300 out of the job list 210 while the unpresented job 310 is expanded.

With this configuration, even if the user is confused by the operation and the unpresented job 310 is expanded, the unpresented job 310 can be easily returned to the state where it is not displayed. Therefore, user convenience can be enhanced.

In the server 1 according to the present embodiment, the specific time is set based on the time corresponding to the user's response to instruct to the filtered job 300.

With this configuration, the time until the unpresented job 310 is expanded can be set, appropriately. Thus, it prevents problems such as slow or too fast expansion and cumbersome movement of the selected filtered job 300. As a result, user convenience can be enhanced.

OTHER EMBODIMENTS

In addition, FIG. 7 of the above-described embodiment describes an example in which all unpresented jobs 310 are expanded when a specific time has passed while the selected job 200 exists.

However, it is not necessary to expand all unpresented jobs 310.

Specifically, in the server 1, the list expanding unit 110, when an instruction to change the selected filtered job 300 in the direction to earlier the printing order is acquired after the specific time has elapsed, only the unpresented job 310 having printing order earlier than the selected filtered job 300 is expanded and presented, and when an instruction to change the selected filtered job 300 in the direction to later the printing order is acquired, only the unpresented job 310 having printing order later than the selected filtered job 300 is expanded and presented.

In other words, when the list expanding unit 110 acquires the instruction to change the printing order upward in the job list 210 after the specified time has passed, the list expanding unit 110 may expand and present only the unpresented job 310 whose printing order is earlier than the selected filtered job 300. On the other hand, when the list expanding unit 110 acquires the instruction to change the print order downward in the job list 210, the list expansion unit 110 may expand and present only the unpresented job 310 whose print order is later than the selected filtered job 300.

According to the example of FIG. 6, when the order of the jobs 200 is changed, when the dragging is performed above the current position after the specific period of time has elapsed, only hidden unpresented jobs 310 that are above the current position in the job list 210 are displayed. When dragging below the current position, only hidden unpresented jobs 310 that are below the current position in the job list 210 are displayed.

As a result, the printing order can be changed with the minimum number of unpresented jobs 310 expanded. Therefore, when the display area in the touch panel is limited, or the like, user-friendliness can be improved by preventing unnecessary information from being shown to the user.

Moreover, in the above-mentioned embodiment, the example which fixed and set the specific time has been described.

However, the specific time may be changed for each user. Also, the specific time may be dynamically changed by using heuristics, statistical models, AI (Artificial Intelligence), or the like.

Specifically, the specific time may be shortened when the selected filtered job 300 is moved without being expanded for each user. Conversely, when the instruction to move the filtered job 300 outside the job list 210 is acquired, the specific time for this user may be lengthened.

By configuring in this way, the printing order can be changed in a more user-friendly manner.

In the above embodiment, an example of setting the priority order of the job 200 in the server 1 has been described.

However, the printing order of the jobs 200 in the image forming apparatus 2 or the terminal 3 may be changed. That means, it is also applicable to the systems without the server 1.

By configuring in this way, it becomes possible to correspond to various configurations.

In addition, in the above-described embodiment, the priority of the job list 210 or the internal priority has not taken into consideration.

However, when the priority is also presented in the job list 210, the instruction acquiring unit 100 may also acquire a change instruction to change the priority.

In this case, the instruction acquiring unit 100 displays the job list 210 on the display unit of the operation panel unit 26. Then, the instruction acquiring unit 100 allows the user to edit the value of the priority or the internal priority when the numerical value of the priority or the internal priority is selected on the GUI. Specifically, the instruction acquiring unit 100 may ask the user to input the number by using the numeric pad or to increase or decrease, or the like, the number by using the direction buttons, and it may acquire the number as the instruction to change the priority or the internal priority.

By configuring in this way, the printing order can be changed more finely, and the user's convenience can be improved.

Further, in the above-described embodiment, an example of setting the filtering job 200 and the unpresented job 310 in the single job list 210 has been described.

However, a list of jobs 200 that collects only filtered jobs 300 or unpresented jobs 310 may be generated and expanded based on this.

By configuring in this way, the processing load can be reduced and the usability can be improved.

Furthermore, in the above-described embodiment, an example in which the image forming unit 27 prints out as the output of the job 200 has been described.

However, the job 200 can be applied to types other than the print job, and it can be output by other types of image formation. For example, a job 200 for image data acquisition by network scanning, generation of electronic documents such as PDF, document processing such as OCR (optical character recognition), or the like, can be output after performing rearrangement processing similar to the above-described output process is possible.

By configuring in this way, an image forming apparatus capable of appropriately setting and adjusting the output order for various jobs 200 can be provided.

Also, the present disclosure can be applied to information processing apparatus other than the image forming apparatus and the server. In other words, a network scanner or a server, or the like, to which the scanner is separately connected via a USB, or the like, may be used.

Also, in terms used in this specification, the singular forms "a," "an," and "the" include plural forms unless the context clearly dictates otherwise.

Further, the configuration and operation of the above-described embodiment are examples, and needless to say, they can be modified and executed as appropriate without departing from the aim of the present disclosure.

What is claimed is:

1. An information processing apparatus capable of changing the printing order of a plurality of jobs, comprising:
    an instruction acquiring unit configured to filter the plurality of jobs according to a specific condition, present a job list in which only a filtered job is arranged in printing order, and acquire an instruction to change the printing order for selected job;
    a list expanding unit configured to expand and present at least part of unpresented job that is not presented by the filtering by the instruction acquiring unit in the job list when a specific time has elapsed while the selected job exists; and
    a list adjusting unit configured to adjust the printing order in the job list according to the instruction having the unpresented job expanded by the list expanding unit.

2. The information processing apparatus according to claim 1, wherein:
    the list expanding unit returns the unpresented job to the unpresented state again when an instruction to move the selected job out of the job list is acquired while the unpresented job is expanded.

3. The information processing apparatus according to claim 2, wherein:
    the list expanding unit presents a hint about the instruction to move the selected job out of the job list while the unpresented job is expanded.

4. The information processing apparatus according to claim 1, wherein:
    the specific time is set based on the time corresponding to the user's response to instruct to the selected job.

5. The information processing apparatus according to claim 1, wherein:
    the list expanding unit,
    when an instruction to change the selected job in the direction to earlier the printing order is acquired after the specific time has elapsed, only the unpresented job having printing order earlier than the selected job is expanded and presented, and
    when an instruction to change the selected job in the direction to later the printing order is acquired after the specific time has elapsed, only the unpresented job having printing order later than the selected job is expanded and presented.

6. An image forming system capable of changing the printing order of a plurality of jobs, comprising:
   an instruction acquiring unit configured to filter the plurality of jobs according to a specific condition, present a job list in which only a filtered job is arranged in printing order, and acquire an instruction to change the printing order for a selected job;
   a list expanding unit configured to expand and present at least part of unpresented job that is not presented by the filtering by the instruction acquiring unit in the job list when a specific time has elapsed while the selected job exists;
   a list adjusting unit configured to adjust the printing order in the job list according to the instruction having the unpresented job expanded by the list expanding unit; and
   an image forming unit that respectively outputs the plurality of jobs in the printing order based on the job list adjusted by the list adjusting unit.

7. The image forming system according to claim 6, wherein:
   the list expanding unit returns the unpresented job to the unpresented state again when an instruction to move the selected job out of the job list is acquired while the unpresented job is expanded.

8. The image forming system according to claim 7, wherein:
   the list expanding unit presents a hint about the instruction to move the selected job out of the job list while the unpresented job is expanded.

9. The image forming system according to claim 6, wherein:
   the specific time is set based on the time corresponding to the user's response to instruct to the selected job.

10. The image forming system according to claim 6, wherein:
    the list expanding unit,
    when an instruction to change the selected job in the direction to earlier the printing order is acquired after the specific time has elapsed, only the unpresented job having printing order earlier than the selected job is expanded and presented, and
    when an instruction to change the selected job in the direction to later the printing order is acquired after the specific time has elapsed, only the unpresented job having printing order later than the selected job is expanded and presented.

11. An image forming method executed by an image forming system capable of changing the printing order of a plurality of jobs, comprising the steps of:
    filtering the plurality of jobs according to a specific condition;
    presenting a job list in which only a filtered job is arranged in printing order;
    causing a job to be selected in the job list;
    acquiring an instruction to change the printing order;
    expanding and presenting at least part of unpresented job that is not presented by the filtering in the job list when a specific time has elapsed while the selected job exists;
    adjusting the printing order in the job list according to the instruction having the expanded unpresented job; and
    outputting, respectively, the plurality of jobs in the printing order based on the adjusted job list.

12. The image forming method according to claim 11, wherein:
    returning the unpresented job to the unpresented state again when an instruction to move the selected job out of the job list is acquired while the unpresented job is expanded.

13. The image forming method according to claim 12, wherein:
    presenting a hint about the instruction to move the selected job out of the job list while the unpresented job is expanded.

14. The image forming method according to claim 11, wherein:
    the specific time is set based on the time corresponding to the user's response to instruct to the selected job.

15. The image forming method according to claim 11, wherein:
    expanding and presenting, when an instruction to change the selected job in the direction to earlier the printing order is acquired after the specific time has elapsed, only the unpresented job having printing order earlier than the selected job, and
    expanding and presenting, when an instruction to change the selected job in the direction to later the printing order is acquired after the specific time has elapsed, only the unpresented job having printing order later than the selected job.

* * * * *